Oct. 2, 1934.    Y. OKUMA    1,975,431
NET MAKING MACHINE
Filed Nov. 16, 1932    8 Sheets-Sheet 1

INVENTOR.
Y. Okuma
BY Marks & Clerk
ATTORNEY.

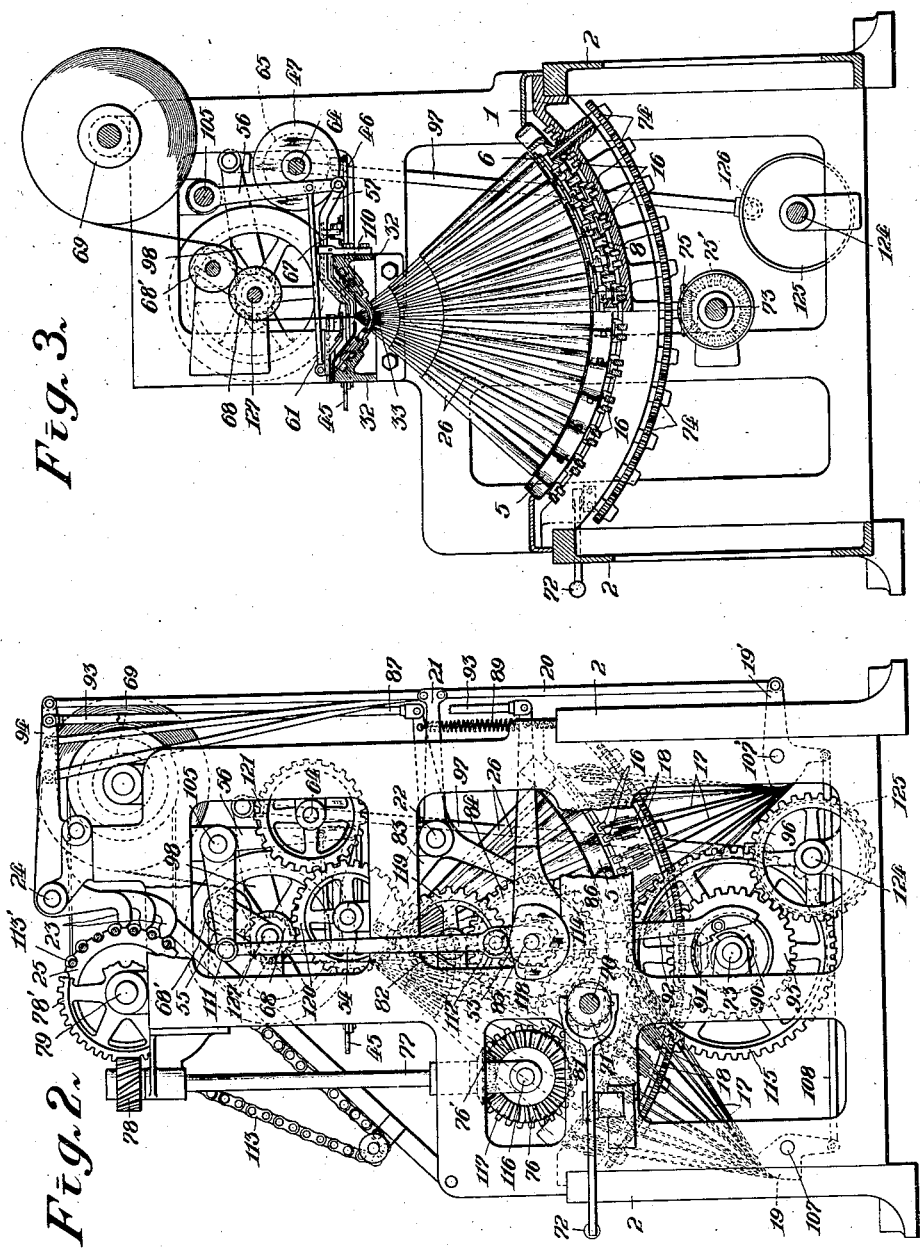

Oct. 2, 1934.    Y. OKUMA    1,975,431
NET MAKING MACHINE
Filed Nov. 16, 1932    8 Sheets-Sheet 3
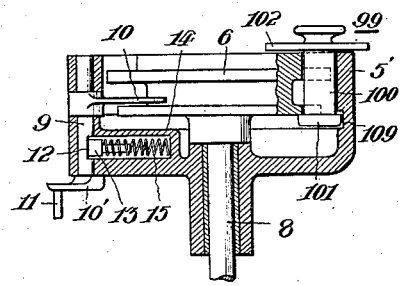
*Fig. 4.*
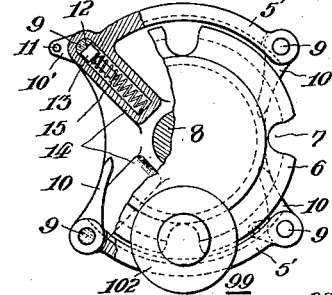
*Fig. 5.*
*Fig. 6.*
INVENTOR.
Y. Okuma
BY: Marks & Clerk
ATTORNEYS.

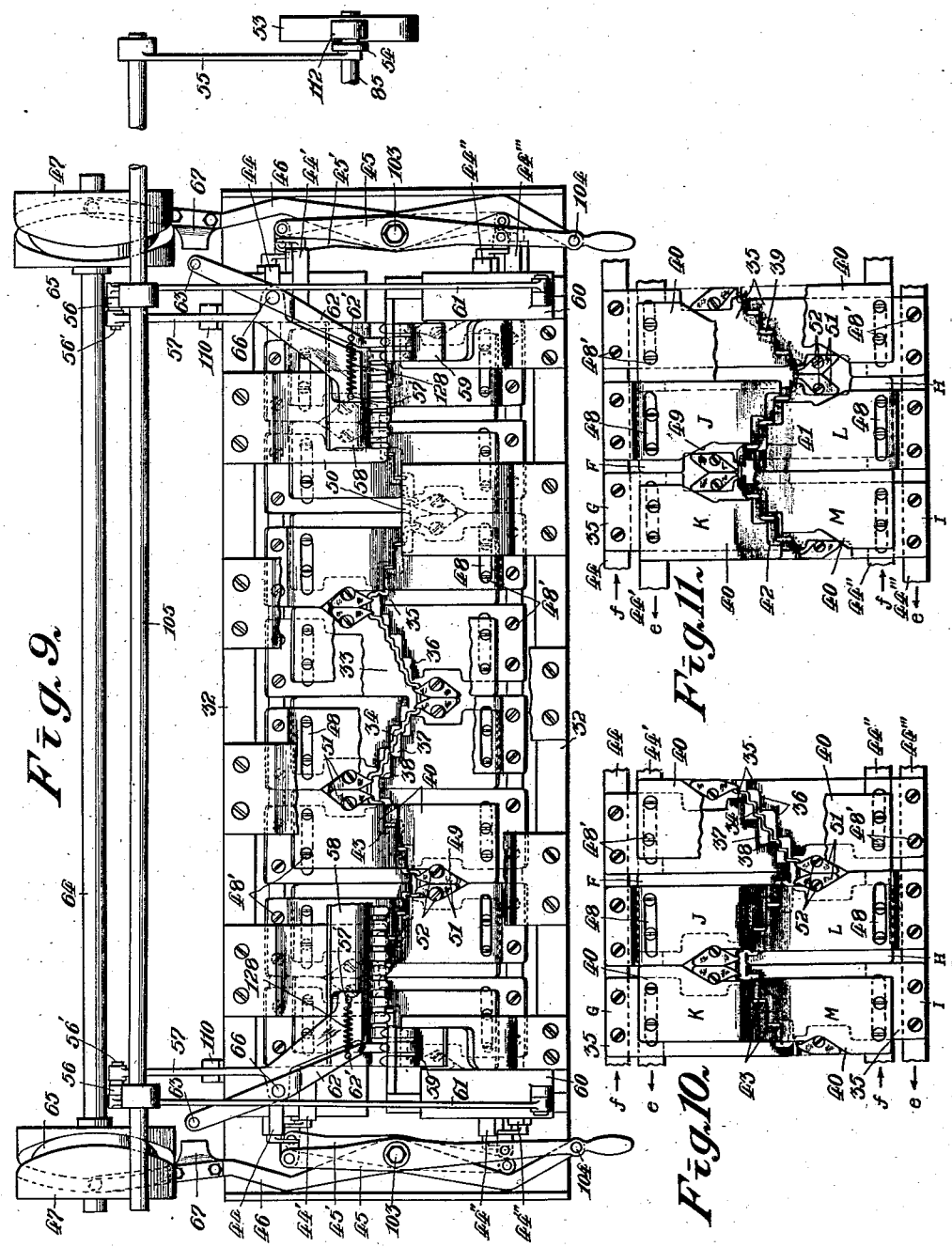

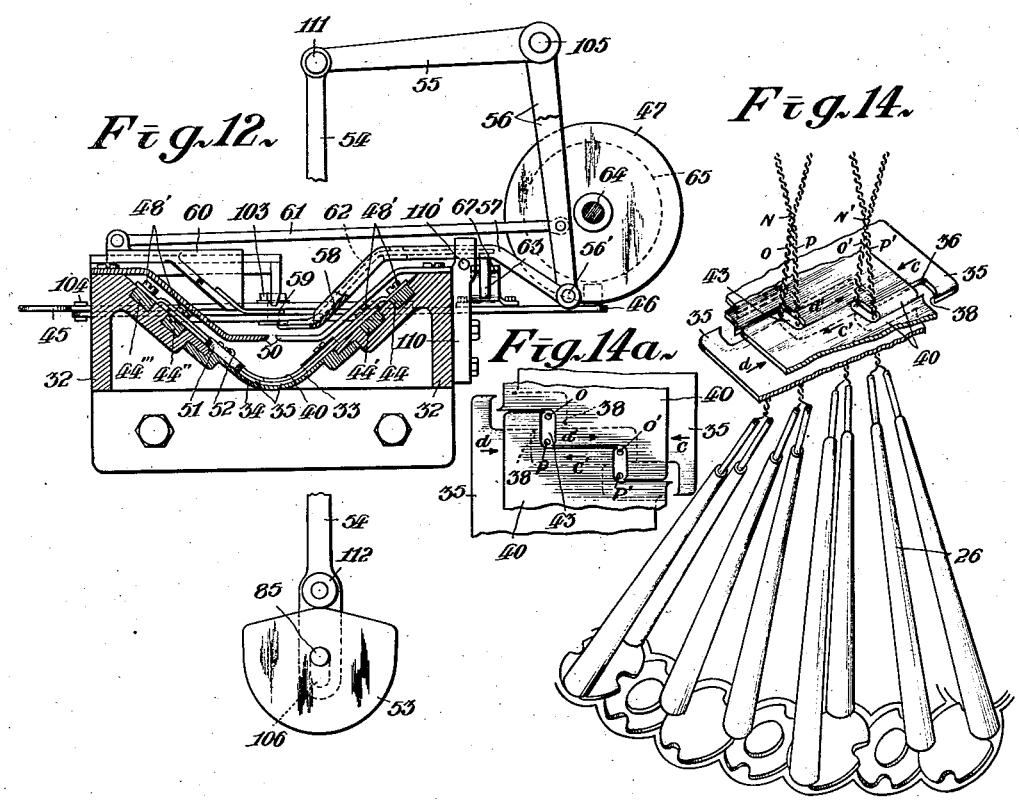

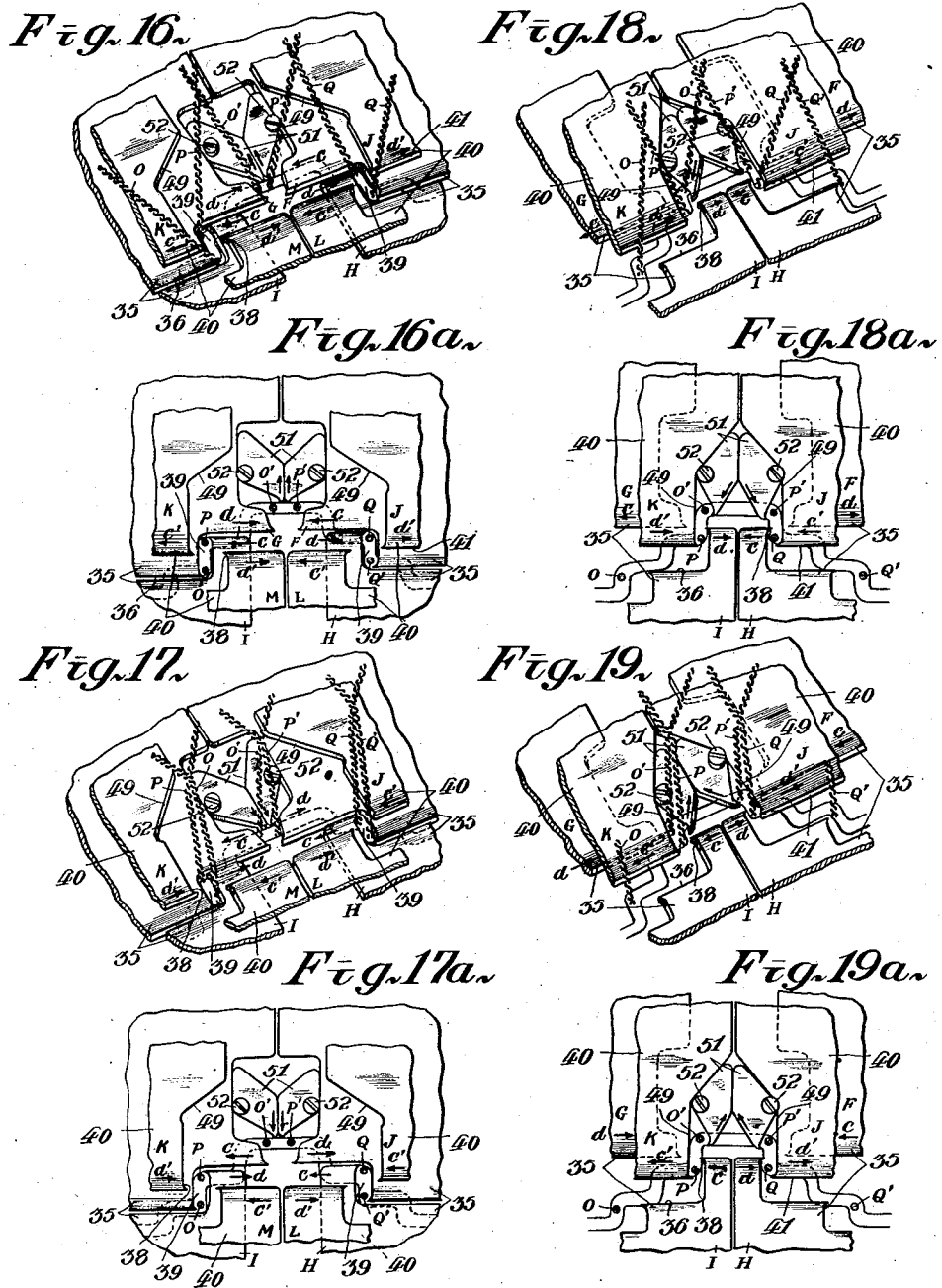

Oct. 2, 1934.  Y. OKUMA  1,975,431
NET MAKING MACHINE
Filed Nov. 16, 1932  8 Sheets-Sheet 8
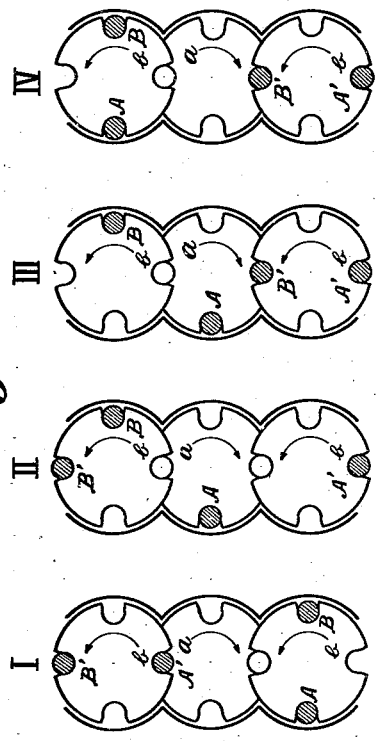
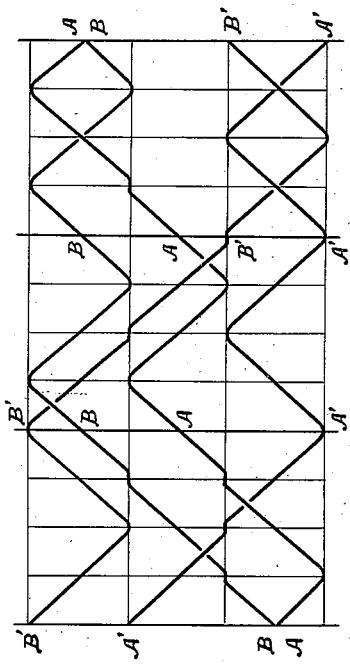
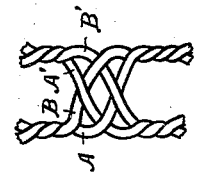
INVENTOR:
Y. Okuma
BY Marks & Clerk
ATTORNEYS.

Patented Oct. 2, 1934

1,975,431

UNITED STATES PATENT OFFICE 1,975,431

NET MAKING MACHINE

Yeiichi Okuma, Fujitsuka-Cho, Higashi-Ku, Nagoya-Shi, Aichi-Ken, Japan

Application November 16, 1932, Serial No. 642,959

9 Claims. (Cl. 96—4)

This invention relates to improvements in machines for making net fabric for fishing and other purposes and more particularly to that class of machines known as knotless net-making machines.

The object of this invention is to provide an improved machine adapted to produce a net fabric having tight crossings and regular meshes in more rapid, accurate, efficient and economic manner than the machines hitherto in use.

In known machines for making net fabric for fishing and other purpose hitherto in use, the spindles have to be intermittently operated in one and other directions, so that undesirable forced and rattle motion of the mechanisms, irregular crossing of strands due to irregular issue of strands from the bobbin-spindles upon crossing operation and irregular meshes of net fabric due to different lengths of the parts of the strands forming a mesh are difficult to be avoided.

This invention embodies various novel means whereby these disadvantages can be done away with, and resides in the features of construction as hereinafter will be described with reference to the accompanying drawings in which:

Fig. 2 is a right hand side elevation of the machine partly cut away to show an inner view.

Fig. 3 is a vertical sectional right hand side elevation taken on the line III—III of Fig. 1.

Fig. 4 is an enlarged vertical sectional view of a housing member forming a race-way with a spindle carrier and a switch.

Fig. 5 is a top plan view of Fig. 4, the carrier disk being partly cut away to show inner view.

Fig. 6 is an enlarged fragmentary perspective view of a part of a mechanism for actuating the switches, an arrangement for disposing of strands and a take-up device.

Fig. 9 is an enlarged and developed top plan detail view of an arrangement for disposing of strands, with an arrangement for regulating meshes of net fabric.

Fig. 10 is a fragmentary top plan view similar to Fig. 9 showing parts in an operated condition for the purpose of illustrating the operation of the arrangement for disposing of strands.

Fig. 11 is a similar view to Fig. 10, showing parts in another operated condition.

Fig. 12 is an enlarged vertical cross sectional view of a minor bed-plate with the arrangement for disposing of strands, the arrangement for regulating meshes of net fabric and some associated members.

Fig. 13 is a fragmentary perspective view of Fig. 12.

Fig. 14 is an enlarged fragmentary perspective view of the lower and upper guide plates in the arrangement for disposing of strands, in an operated position.

Fig. 14a is a top plan view of Fig. 14.

Fig. 15 is a similar view to Fig. 14, in another operated position.

Fig. 15a is a top plan view of Fig. 15.

Figs. 16, 17, 18 and 19 are enlarged fragmentary perspective views of the lower and upper guide plates with horns in pair cooperating with these plates, in several stages of operation.

Figs. 16a, 17a, 18a and 19a are top plan views of Figs. 16, 17, 18 and 19 respectively.

Fig. 20 is an illustrative view showing analytically a crossing formed by two pairs of strands.

Fig. 21 is a diagrammatic view of the race-ways illustrating the movements of bobbin-spindles during the formation of the crossing as shown in Fig. 20.

Fig. 22 is a diagram of the tracks of two pairs of strands during the formation of the crossing as shown in Fig. 20, drawn with reference to Fig. 21.

Fig. 23 is an illustrative view showing analytically a modified crossing formed by two pairs of strands.

Figure 1:
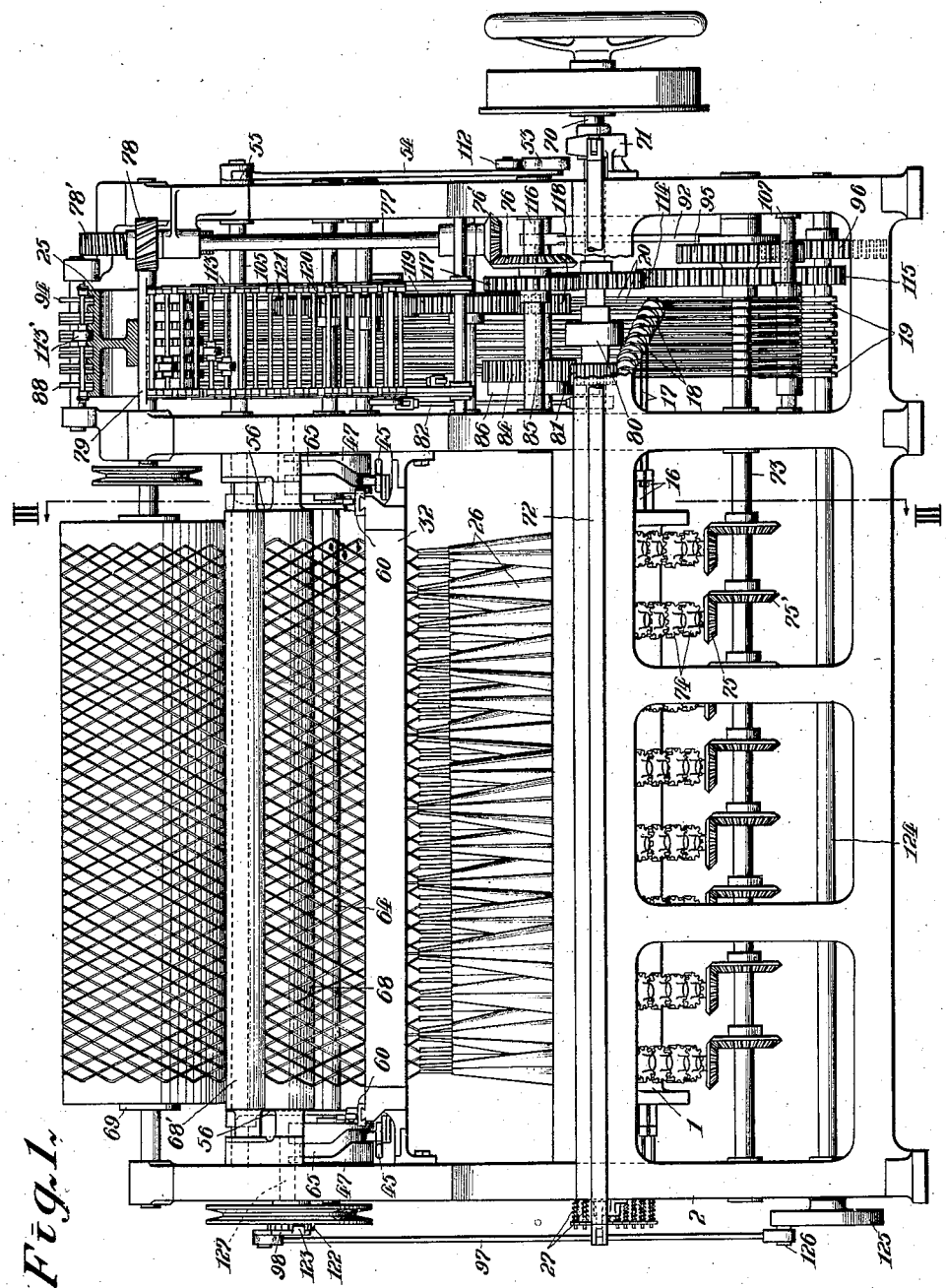
Fig. 1 is a front view, partly in section, of a machine embodying my invention.

The machine comprises in combination an arrangement for twisting and crossing strands, devices for re-twisting strands, an arrangement for disposing of strands, an arrangement for regulating meshes of net fabric and an operating mechanism, which will be now fully described.

Arrangement for twisting and crossing strands

Referring to Figs. 1, 2, 3, 7 and 8, 1 represents an arcuated bed-plate of suitable length which is rigidly mounted on standards 2, 2 in longitudinal and horizontal relations, so as to build up a machine frame unit. In the bed-plate, there is provided a series of race-ways consisting of twisting race-ways 3 and crossing race-ways 4 (Figs. 7 and 8), in which the spindle carriers 99 (Fig. 4) carrying the bobbin-spindles 26 work when propelled through means of carrier disks 6 for the purpose of effecting the twisting and crossing of strands. The twisting race-ways and the crossing race-ways are of the same construction, but different reference numerals 3 and 4 are given them respectively for convenience sake for explanation. The series of raceways is arranged sinuously in several parallel rows transversely across the bed-plate, at the junction of two adjacent rows being disposed a crossing race-way. The twisting and crossing race-ways are arranged alternately, a crossing race-way being positively interposed between two twisting race-ways. It will be apparent that, therefore, either end race-way of each row of the series of the race-ways is a twisting race-way and the race-way at the junction of two rows is a crossing race-way.

An additional exchange race-way 28 is provided at either end of the series of the race-ways for purpose as will be hereinafter described.

Figure 8:
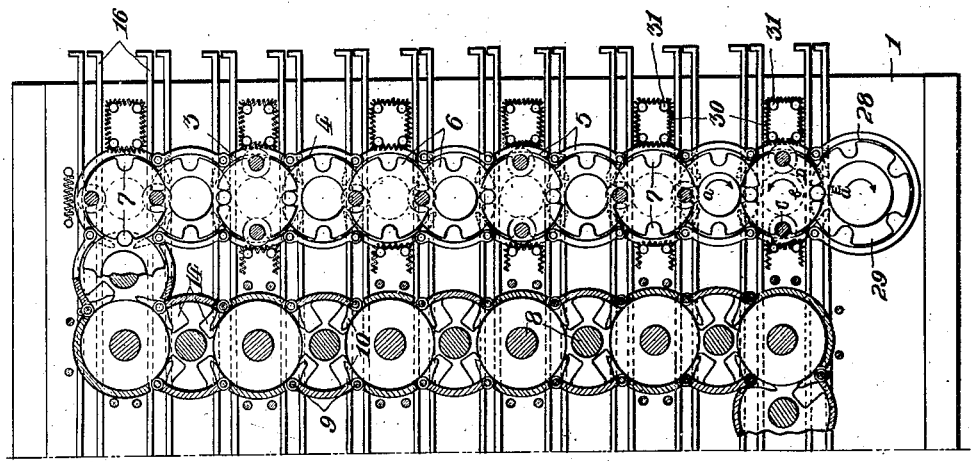
Fig. 8 is a developed top plan view of Fig. 7, partly in section and the bobbin-spindles being removed.
Figure 7:
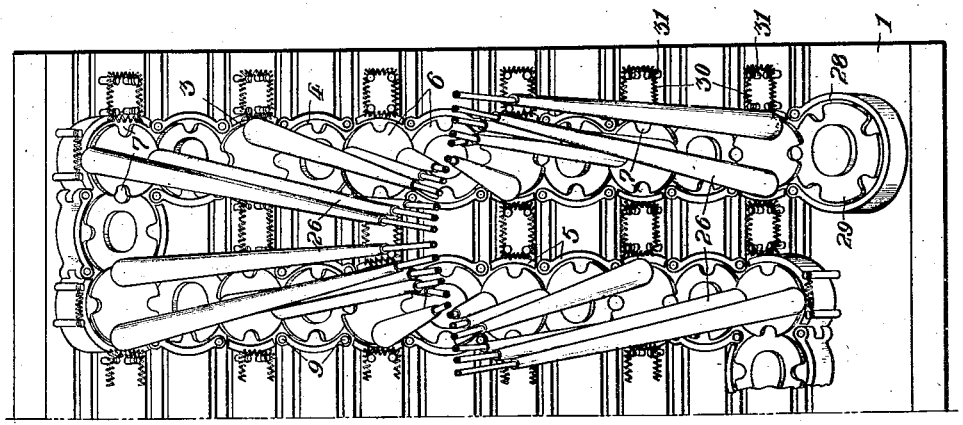
Fig. 7 is an enlarged fragmentary top plan view of the machine showing two rows of the race-ways with an exchange race-way, bobbin-spindles and devices for re-twisting strands.

To form the series of the race-ways, a series of circular carrier disks 6 of a certain diameter, which are arranged in sinuous relation in several rows transversely across the bed-plate 1 and overlapping one with another by a radial length corresponding to the diameter of the body 100 of a spindle carrier 99 (Fig. 4) which will be hereinafter described, is rotatably supported in a sinuous recess or groove formed by corrugated walls 5 so as to correspond to general outline of the series of the race-ways formed in the bed-plate 1 (Figs. 7 and 8). The overlapped part of each disk is reduced in thickness so as to engage with contiguous disk or disks in a scarf joint-like manner, as shown in Fig. 3.

The sinuous groove for receiving the series of the carrier disks may preferably be built up by means of a series of housings 5' having walls, each corresponding to a corrugation of the corrugated walls 5, secured on the bed-plate 1, one of which is shown in Figs. 4 and 5.

Each disk is provided with notches 7 at its periphery, each of which is adapted to support the spindle carrier 99. In the present instance, these notches are shown as being four notches at an angle of 90°, but six notches may be provided if three strands are used instead of two strands which will be considered herein. Each disk is also provided with an arbor 8 which extends downwards through the bed-plate 1 and carries a gear 74 which is adapted to mesh with other gear or gears in train fixed on arbor or arbors of contiguous disk or disks, so that the disks will be rotated in contrary directions in pair from a main driving shaft 70 through means of bevel gears 75, 75' as will be fully described hereinafter (Figs. 1, 3 and 6). The bobbin-spindle 26 is carried by each spindle carrier 99 supported by the disk 6 as shown in Figs. 4 and 7.

Now the arrangement with two bobbin-spindles on each carrier disk in twisting race-way will alone be considered, as may be case with only two strands to be twisted together.

With this arrangement, it will be appreciated that strands issuing from the bobbin-spindles will converge substantially on or near the axis extending horizontally along the length of the bed-plate 1 through the center of curvature thereof, and all the bobbin-spindles may be of the same length, as shown in Fig. 7.

Near each junction of two contiguous corrugations of the groove, a switch 10 is secured on a pin 9 rotatably mounted on the corrugated wall 5, as shown in Figs. 4, 5, 6 and 8. The switch has a curved face at either side so as to conform with the curvature of each corrugation of the groove. An arm 10' is fixed on the lower end of the pin 9 and has a small pin 11 adapted to engage with a slide bar 16 (Fig. 6) for actuating the switch 10. The switch 10 is normally held in such a position (Fig. 8) as to open the twisting race-way with a curved side forming a continuity of the corresponding corrugation of the groove, by means of a pusher 13 pressed by a spring 15 disposed in a casing 14 provided on the bottom of the housing 5' to engage with a notch 12 provided in the pin 9 (Figs. 4 and 5). Each switch 10 may be actuated by means of the pin 11 in time to such a position as to open the crossing race-way with other curved side forming a continuity of the corresponding corrugation of the groove, closing the twisting race-way, whereby the spindle carrier 99 may be transferred from the twisting race-way into the crossing race-way, together with the bobbin-spindle 26. The turning movement of the switches from their normal position in which the twisting race-ways are opened and the crossing race-ways are closed into the position closing the twisting race-ways and opening the crossing race-ways is effected by means of slide bars 16 (Figs. 6 and 8) actuated from a pattern mechanism, the drum of which is indicated by reference numeral 25 in Figs. 1 and 2. Each slide bar is arranged longitudinally on the bed-plate 1 and is provided with a number of notches adapted to engage with the pins 11 in the corresponding longitudinal series of the switches (Figs. 6 and 8) and is held in its normal position by spring 27 (Fig. 1) at its left hand end. Each of the front half number of the slide bars 16 is connected at its right hand end with one arm of lever 19 rotatably mounted in a shaft 107 fixed to the machine frame by means of rope 17 over grooved pulley 18, while each of the rear half number of said slide bars is similarly connected with one arm of lever 19' rotatably mounted in a shaft 107' (Figs. 2 and 6). The other arm of the lever 19 is connected to the lower projecting arm of the lever 19' by means of a connecting link 108. The other arm of the levers 19' is connected with the lower end of connecting links 20 which are provided at their midway with brackets 21, the fore end of which is rotatably mounted on a shaft 22 fixed on the machine frame. The upper ends of the connecting links 20 are connected with the rear ends of jacks 23 which are pivotally mounted on a shaft 24 fixed on the machine frame, while the fore end is arranged to operatively engage with the pattern roller 113' of the pattern mechanism. The control of operation of the switches is determined by the pattern roller 113', so that various crossing of strands, simple or complex or partly simple and partly complex, and various sizes of the meshes of net fabric can be obtained.

Each of the spindle carriers 99 is provided at either end of its cylindrical body 100 with collars 101 and 102 respectively and is held by the carrier disk, a part of the lower collar 101 being arranged to engage with groove 109 provided in the aforesaid housing or corrugated wall, and the cylindrical body 100 being inserted into the notch 7, as shown in Fig. 4. Any suitable provision is made on the upper collar 102 for holding the bobbin-spindle, which forms no part of the invention.

The arrangement of the bobbin-spindles in the race-ways is of the greatest importance in order to ensure the positive operation of the machine. The number of the notches 7 in each carrier disk 6 must be equal to two times the number of strands to be twisted together. Here the notches have been shown as being four in number, strands being two in number. The spindle carriers 99 are inserted alternately in the notches of each carrier disk. The spindle carriers inserted in the carrier disk in a twisting race-way must be displaced an angle of 90° in phase from those inserted in the carrier disk in the next twisting race-way interposed a crossing race-way, so that the bobbin-spindles may be propelled without any collision with one another. It will be noted that when each carrier disk is provided with six or eight notches instead of four the above said displacement angle should be 60° or 45° respectively. However, in case a net fabric with a crossing as shown in Fig. 20 is to be produced the bobbin-spindles have to travel from one end race-way of the series of the race-ways to other end one therethrough and then vice versa to take their reverse course. In this case, when the bobbin-spindles are changing their course in one end race-way of the series of the race-ways, the bobbin-spindles are liable to cause some collision with one another, unless a suitable provision is made for preventing such collision. It will be seen that the collision of the bobbin-spindles may be avoided by causing each bobbin-spindle which is about taking the reverse course to transfer to the notch advanced or lagged one pitch from the notch in which said bobbin-spindle has been inserted before taking the reverse course. For this purpose, the exchange race-way 28 (Figs. 7 and 8) is provided at either end twisting race-way of the series of the race-ways. The exchange race-ways 28 are constructed similarly to any other ordinary race-way, excepting that the number of the notches of the disk differs from that of the notches in the disk of the ordinary race-ways, the circular pitch being the same, so that the diameter of the race-way and hence the disk must be altered accordingly. The revolving speed of the disk is adjusted in such a manner that the linear velocity of a point on the pitch circle of the notches of the disks in the exchange race-ways is equal to that of a point on the pitch circle of the notches of the disks in the ordinary race-ways. Each bobbin-spindle which is about taking reverse course in either end twisting race-way is transferred therefrom to the corresponding notch of the disk 29 in the exchange race-way wherein the disk is rotated and then is transferred back to the twisting race-way again, so that each bobbin-spindle is returned to the notch advanced or lagged one pitch from the original notch in the disk in the twisting race-way, whereby the collision between the spindles may be avoided.

To further illustrate the operation of the exchange race-way with reference to Fig. 8 by way of example, it is assumed that the disk in the exchange race-way is provided with five notches while each disk in the ordinary race-ways is provided with four notches, that the diameter of former disk is greater than that of the latter disk, that the revolving speed of the former disk is smaller than that of the latter disk so that the former disk rotates through an angle of 72° between its two consecutive notches while the latter disk rotates through an angle of 90° between its two consecutive notches, in such a manner that the notches of the disks in the exchange and contiguous twisting race-ways will register with each other when passing on the horizontal line connecting the centers of both disks and that the disks are revolving in the contrary directions as indicated by the arrows $a$ and $b$. Moreover, it is assumed for convenience sake for explanation that two diametrically opposite bobbin-spindles in the twisting race-way contiguous to the exchange race-way are indicated by reference characters C and D. While the disk carrying the bobbin-spindles C and D and the disk in the exchange race-way are rotating in contrary directions indicated by arrows $b$ and $a$ respectively, the bobbin-spindle C when brought into the registration with a notch of the disk in the exchange race-way at the position indicated by E may be transferred from the twisting race-way into the exchange race-way, provided that the exchange race-way is opened and the twisting race-way is closed at that moment, and in the similar manner another bobbin-spindle D may be also transferred from the twisting race-way into the exchange race-way when brought into the registration with another notch of the disk in the exchange race-way, provided that the exchange race-way is opened and the twisting race-way is closed. Thus the bobbin-spindles C and D are transferred from the twisting race-way into the exchange race-way, the bobbin-spindles being carried by a notch and the next notch but one, of the disk in the exchange race-way, as readily seen. Then, the bobbin-spindles C and D propelled in the exchange race-way when brought into the registration with notches of the disk in the twisting race-way in succession in the position indicated by E may be transferred back from the exchange race-way into the twisting race-way, provided that the twisting race-way is opened and the exchange race-way is closed at the respective moment. It will be readily seen that the bobbin-spindles C and D now transferred back from the exchange race-way into the twisting race-way are carried by other two diametrically opposite notches of the disk in the twisting race-way than those originally carried these bobbin-spindles, by tracing the way travelled by these bobbin-spindles.

The arrangement provides a novel means of ensuring positive operation of the bobbin-spindle without causing any collision. It will be understood that the same effect can be obtained by employing the carrier disk in the exchange race-way smaller than that in the ordinary race-ways, in this case the number of the notches being reduced accordingly while the revolving speed of the disk being increased accordingly.

In operation, the spindle carriers 99 are inserted alternately into the notches 7 on the carrier disks 6, and the bobbin-spindles are securely held on the spindle carriers by suitable means, and the switches are positioned so as to open the twisting race-ways. The carrier disks are now rotated, whereby the bobbin-spindles are propelled round the twisting race-ways so as to cause the strands to be twisted together. When the strands have been twisted together through a desired length, the sliding bars 16 are caused to be moved from the pattern mechanism through means of the jacks 23 engaged with the pattern roller 113' (Fig. 1), the connecting links 20, the levers 19, 19' and ropes 17, so that the switches are momentarily moved to close the twisting race-ways and to open the crossing race-ways. The spindle carriers with the bobbin-spindle thereon are now transferred from the registered notches of the carrier disks in the twisting race-ways to the notches on the carrier disks in the crossing race-ways. The bobbin-spindles transferred from two twisting race-ways contiguous to a crossing race-way to said crossing race-way are brought to a cross motion so as to cause the strands to cross, and then the switches are momentarily operated to transfer back the bobbin-spindles from the crossing race-way to the twisting race-ways and to transfer other bobbin-spindles from the twisting race-ways to the crossing race-way to cause the crossing of the strands, whereby the crossing of the strands is obtained.

To illustrate a manner in which a crossing is effected with reference to Figs. 20, 21 and 22, by way of example, two pairs of strands, each consisting of strands A, B and A', B' respectively, are to be considered here. When each pair of strands is twisted together through a desired length, first the strand A' is brought to cross over strand B, and then the strand A is brought to cross over strand A', and similarly strand B is brought to cross over strand B', and then the strand B' is brought to cross over strand A, and then strands A', B' and A, B are twisted together respectively in pair. In this case, the bobbin-spindles for the strands A, B and A', B' are originally in the positions as indicated by A, B and A', B' respectively in I of Fig. 21. It is assumed that the carrier disks are revolving continuously in the directions as indicated by arrows $a$ and $b$ respectively.

When the carrier disks make one complete revolution from the positions as shown in I to the positions as shown in II of Fig. 21, the bobbin-spindles A, B and A' are respectively in the positions as shown in II while the bobbin-spindle B' remains in the original position, and it will be understood that on each successive complete revolution of the carrier disks the bobbin-spindles will be successively in the positions as shown in III and IV (Fig. 21) and the tracks of strands can be indicated in the diagram as shown in Fig. 22, as will be understood without any further description.

In Fig. 23, a modification of the crossing of strands is illustrated, but any further description in connection with the manner for forming the crossing is omitted, as such forms no part of the invention. However, it will be noted that in this case the bobbin-spindles will not travel from one end of the series of the race-ways to other end, and accordingly the exchange race-ways will be out of service.

The above mentioned arrangement is an important feature of my invention, whereby net fabric can be produced by operating each carrier disk continuously in constant direction so as to enable the machine to operate always in good condition without any violent shock.

*Re-twisting devices*

In order to produce a perfect net fabric, it is essential that each strand is properly twisted. As the initial twist given to each strand will become somewhat untwisted during dealing with it, it is desirable to provide re-twisting devices for re-twisting such untwisted strands. Each re-twisting device according to my invention comprises a coiled spring adapted to engage with a knurled end (not shown) of each bobbin-spindle so as to cause the bobbin-spindle to rotate on its axis upon the engagement of its knurled end with the spring when propelled in a twisting race-way, so that strand issuing from the bobbin-spindle may be twisted. The knurled end of my bobbin-spindle is shown better in my copending application No. 642,958.

The device is illustrated in Figs. 7 and 8 by way of example, in which a coiled spring 30 is held in such a position that a portion of the spring lies in a twisting race-way to engage with a knurled end of a bobbin-spindle which is propelled in a twisting race-way, by means of four studs 31 secured on the bed-plate or the corrugated wall of the groove and near either side of each twisting race-way. It will be understood that the spring may be arranged in any other suitable manner without departing from the above said scope. When the knurled end of each bobbin-spindle engages with the coiled springs while it is being propelled round a twisting raceway, the bobbin-spindle is caused to be rotated, whereby the strand issuing from the bobbin-spindle is caused to be twisted. Thus, the devices provide a novel means for re-twisting each strand which will become somewhat untwisted during the dealing with it, to ensure the production of a perfect net fabric. This is an important feature of the invention.

*Arrangement for disposing of strands*

The arrangement comprises a minor bed-plate 33, arcuated and substantially of the same length as the bed-plate 1, which is supported on the frame 32, longitudinally above the bed-plate 1 (Figs. 3, 9 and 12). The minor bed-plate is formed in its bottom part with a long continuous zigzag and stepped groove 34 extending substantially through its length to form a guide-way for strands. The guide-way consists of sections of the same number as the rows of the race-ways and arranged substantially in zigzag relation. Each section is formed with steps as shown of the same number as the twisting race-ways in each row of the race-ways, each junction of two contiguous sections being formed by the longitudinal portions of two contiguous end steps of the sections, as partly seen in Figs. 9, 10 and 11. The minor bed-plate 33 may be made in one body or several portions.

On the minor bed-plate 33 is longitudinally slidably mounted a number of lower guide-plates 35 in pair. The number of pairs is the same as that of the sections of the guide-way in the minor bed-plate 33. Each pair comprises front and rear ones arranged oppositely so as to cross the bed-plate 1 above the corresponding section of the guide-way, with their two adjacent inner ends above the corresponding section of the guide-way so as to permit these to cooperate in operation. Each guide-plate is formed at its inner end with stepped notches 36, each with a curved edge 38; the notches of the pairs of guide plates forming oblong holes 37 (Figs. 9 and 10) when the pairs of plates are moved in opposite directions away from each other so that each oblong hole includes two steps of the corresponding section of the guide-way in the minor bed-plate 33, and is arranged to be longitudinally moved through a length corresponding to the length of one step of the groove 34 plus the length of the projection of the curved edge 38, so that the guide-plates in pair when the front one of them is moved rightward and the rear one leftward to the extremity of their stroke in opposite directions form a small hole 39 (Fig. 11) registering with the transverse portion of the guide-way between the two steps, lying in the right-angled direction to the axis of the minor bed-plate 33, while when the front one is moved leftward and the rear one rightward to the extremity of their stroke in opposite directions form an oblong hole 37 (Fig. 9) sufficient to diagonally include two steps of the guide-way as above said. It will be readily appreciated that there is a space sufficient to permit the movement of the guide-plates as above said between two adjacent guide-plates.

On the minor bed-plate 33 is also longitudinally slidably mounted above the lower guide-plates 35 a number of upper guide-plates 40, which are similar to the lower guide-plates in construction and arrangement, but the stepped notches 41

(Fig. 11) are displaced from those of the lower guide-plates in phase so that the upper guide-plates in pair when the front one is moved rightward and the rear one leftward to the extremity of their stroke form an oblong hole 42 (Fig. 11) such as each diagonally includes two steps of the corresponding section of the guide-way in the minor bed-plate, one of which being a step of two steps included in an oblong hole formed by the lower guide-plates in pair and the other step included in an adjacent oblong hole formed by said lower guide-plates in pair. The upper guide-plates are arranged to be longitudinally moved on the minor plate in the contrary directions to those of the lower guide-plates at each time, while the length of the stroke is the same as that of the lower guide-plates, so that the front one of the upper guide-plates in pair will be moved rightward and the rear one leftward to form small holes 43 (Fig. 10) registering with the transverse parts of the guide-way between two steps and lying in the right-angled direction to the axis of the minor bed-plate 33, viz which are located between one pair of two steps included in an oblong hole and another pair of two steps included in a contiguous oblong hole and are not under the control of the lower guide-plates, while the front one of lower guide-plates in pair is moved leftward and the rear one rightward to form the oblong holes, each including two steps of the guide-way, as shown in Fig. 11. The small holes 39 and 43 formed by the lower and upper guide-plates in pair respectively are adapted to bring twines together in them upon crossing, as will be fully described hereinafter. Thus, the lower and upper guide-plates are arranged in such a manner that the lower guide-plates are adapted to serve for forming two opposite crossings of each mesh of net fabric, while the upper guide-plates are adapted to serve for forming other opposite crossings.

In the upper guide-plates, each of two adjacent extreme notches of two adjacent guide-plates above each junction of the sections of the guide-way is displaced by a horn 51 having a substantially rhombic body, the upper guide-plates being formed at one side edge as indicated by 49 for that purpose (Figs. 9, 10, 11, 16, 16a, 17, 17a, 18, 18a, 19 and 19a). The horns are pivotally mounted on the studs 52 fixed on the minor bed-plate 33 near one end of their shorter diagonals so that they may cooperate in pair so as to close or open their tips. The lower and upper guide-plates are cut at one side edge to provide the spaces for the horns and to form side edges to cooperate with the sides of the rhombic bodies of the horns in partaking of the closing and opening operation of the tips of the horns as will be fully described hereinafter.

The construction of an arrangement for operating the lower and upper guide-plates will now be described with reference to Figs. 9, 10, 11 and 12. For the convenience sake for explanation, the lower and upper guide-plates particularly indicated by the reference characters F, G, H and I and J, K, L and M respectively will be now considered (Figs. 10 and 11). The arrangement of the lower guide-plates F, G, H and I is such as to move two adjacent guide-plates F and G in the contrary directions, while the guide-plates H and I are to be moved in the contrary directions to those of the movement of the guide-plates F and G respectively as above mentioned. The arrangement of the upper guide-plates is also such as to move the guide-plates J, K, L and M in contrary directions to those of the movement of the lower guide-plates F, G, H and I respectively. In other words, the arrangement is such as to move the lower guide-plates G and H and the upper guide-plates J and M in the same direction, while the lower guide-plates F and I and the upper guide-plates K and L are moved in the same direction but contrary to that of the movement of the lower guide-plates G and H and the upper guide-plates J and M.

For this purpose, the guide-plates G and J are secured on a slide bar 44, the guide-plates F and K on a slide bar 44', the guide-plates M and H on a slide bar 44'' and the guide-plates I and L on a slide bar 44'''. These slide bars are inserted into grooves respectively formed longitudinally on either side of the frame 32 for the minor bed-plate, as seen in Fig. 12, and arranged to be moved in the directions as indicated by arrows e and f or reverse directions respectively, as shown in Figs. 10 and 11. In order to permit said movement of the lower and upper guide-plates, it will be noted that the screws 48' for securing the upper guide-plates K and M on the slide bars 44' and 44'' respectively are arranged to extend through slots 48 formed in the lower guide-plates G and I respectively so as to permit the necessary movement of said lower guide-plates, while the heads of the screws for securing the lower guide-plates F and H on the slide bars 44' and 44'' respectively are preferably arranged to engage with the slots 48 provided in the upper guide-plates J and L so as not to interfere with the necessary movement of said guide-plates.

The driving mechanisms of the slide bars 44, 44', 44'' and 44''' will now be described with reference to Fig. 9. It is to be noted that the mechanisms are of the same construction on the left and right-hands and that the similar reference numerals are given to the similar parts. The ends of the slide bars 44 and 44''' are on the left-hand pivotally connected with a connecting lever 45, while they are on the right-hand pivotally connected with a connecting lever 45'. The ends of the slide bars 44' and 44'' are on the left-hand pivotally connected with a connecting lever 45', while they are on the right-hand pivotally connected with a connecting lever 45. The connecting lever 45, an actuating lever 46 shown as having two bends and the connecting lever 45' are all rotatably mounted together on a pivot 103 on either side of the frame 32. The actuating lever 46 is at its fore end pivotally connected with a fore extension of the connecting lever 45 at 104, while another end is arranged to be in operative engagement with a cam 47 with a cam way 65 which is rigidly mounted on a shaft 64 journalled on the machine frame, so that the slide bars may be operated from the cams so as to move the lower and upper guide-plates as above mentioned.

In operation, after crossings N and N' are formed by pairs of strands O, P and O', P' respectively in the small holes 43 formed by the upper guide-plates 40, 40 in pair and each pair of strands has been twisted together through a desired length as shown in Figs. 14 and 14a, the lower guide-plates 35, 35 in pair and the upper guide-plates 40, 40 in pair are caused to move in directions as indicated by arrows c, d, c' and d' respectively, until they are brought in the positions as shown in Figs. 15 and 15a. Upon the movement, the twine P is brought rightward into the small hole formed by the lower guide-plates 35, 35 in pair in the middle of two consecutive small holes which are to be formed by the upper guide-plates 40, 40 in pair, being hooked by the curved edge of the notch, while the other twine O is brought leftward into the left-hand consecutive small hole, and the twine O' is similarly brought leftward into the same small hole as that into which the twine P is brought, while another twine P' is brought rightward into the right-hand consecutive small hole. Now, the strands composing twines such as P and O' will be crossed in pair and then twisted together through a certain length in each small hole formed by the lower guide-plates in pair and then divided to be brought into small holes formed by the upper guide-plates in which next crossing and twisting will be effected, and so on.

It will be noted that a pair of twines are brought into a small hole formed by the lower or upper guide-plates in pair for the purpose of bringing into the portion of each step of the guide-way in the minor bed-plate in transverse direction in respect to the minor bed-plate, wherein the crossing and twisting of strands are to be effected.

Upon the crossing operation in the crossing race-way at each junction of two rows of the race-ways, the pair of twines such as O' and P' (Figs. 16 to 19a) may be brought together into the crossing position or the middle part of the groove formed by two continuous portions of two contiguous end steps of each section of the guide-way in the minor bed-plate in longitudinal direction in respect of the minor bed-plate, by means of the lower guide-plates in pair, the extremity of the end notch being formed as shown in Figs. 16 and 16a, but it is too difficult to bring separately the pairs of twines into each portion of two contiguous end steps of each section of the guide-way in the minor bed-plate in transverse direction in respect to the minor bed-plate, after the crossing has been completed and each pair of strands has been twisted together through a certain length to begin the next crossing, as the crossing race-way at the junction of two rows of the raceways is contiguous to two twisting race-ways in longitudinal direction in respect to the minor bed-plate, while each of other ordinary crossing race-ways is contiguous to two twisting race-ways in transverse direction in respect to said minor bed-plate. In order to obviate this difficulty, the horns 51 in pair are provided as aforementioned.

The operation of the horns will be described with reference to Figs. 16, 16a, 17, 17a, 18, 18a, 19 and 19a. In Figs. 16 and 16a, a pair of strands O' and P' is brought in the crossing position in respect to the crossing race-way at the junction of two rows of the race-ways by the extremities of two contiguous end notches of the lower guide-plates in pair, which extremities are of special shape as shown, other pairs of twines O, P and Q, Q' being brought into the small holes formed by the lower guide-plates at the both sides of said crossing position of a pair of twines O' and P'. In this case, the tips of the horns in pair are brought in closed position and at the same time in retracted position such as not to interfere with the taken up movement of net fabric by the extremities of the end notches of the lower guide-plates 35, 35 in pair which engage with the tips of the horns to turn the horns on the studs 52, 52, the upper guide-plates in pair being opened. When the crossings have been completed and strands in pair have been twisted together through a certain length as shown in Figs. 17 and 17a, the lower guide-plates 35, 35 in pair will be moved in directions indicated by arrows c and d to their opened position, and the upper guide-plates 40, 40 in pair will be moved in directions indicated by arrows c' and d' to their closed position and to open the horns in pair by the side edges of the upper guide-plates adapted to engage with rear sides of the bodies of the horns in pair to turn the horns on the studs 52, 52, thereby a pair of twines O' and P' being brought into the portion of two contiguous steps at the junction of two contiguous sections of the guide-way in the minor bed-plate in transverse direction in respect to the minor bed-plate, as shown in Figs. 18 and 18a. When the crossings have been completed and strands in pair have been twisted together through a certain length as shown in Figs. 19 and 19a, the lower guide-plates in pair will be moved to their closed position and to bring the horns in pair to their closed position, while the upper guide-plates in pair will be moved in their opened position as shown in Figs. 16 and 16a. Thus, the operation will be repeated over and over again.

The produced net fabric is to be taken up in flattened state by a take-up device, while strands issuing from the bobbin-spindles are led upward in zigzag through the zigzag guide-way in the minor bed-plate and the lower or upper guide-plates. It is desirable, therefore, to regulate the arrangement of strands led upward in zigzag through the zigzag guide-way and the lower or upper guide-plates so as to be put in order in nearly straight line as far as possible. For this purpose, a set of guide-plates 50 (Figs. 9 and 12) is secured at the outer ends on the frame 32 opposite the raised side of each junction of two contiguous sections of the guide-way in the minor bed-plate 33 so as to extend the inner ends over the upper guide-plates 40. It will be noted that the guide-plates are of a width and length sufficient to let strands lead through the zigzag guide-way and the lower and upper guide-plates come on the longitudinal straight line passing through the middle points of several sections of the guide-way in the minor bed-plate 33.

With the arrangement, the displacement and operation of twines are easily and smoothly effected without causing any strand to be impaired, and the crossing and twisting of strands are effected by confining twines in a small hole formed by the co-operation of the guide-way in the minor bed-plate and the lower and upper guide-plates, so that tight crossings and regular twistings of strands can be ensured, it being also effective for obtaining regular meshes of net fabric.

*Arrangement for regulating meshes of net fabric*

The arrangement comprises a comb-like plate 58, two minor comb-like plates 59 and two tensioning members 62. The comb-like plate 58 is provided with teeth adapted to engage with the last crossings of produced net fabric and twines diverging downward from the crossings, or the meshes of the last row of produced net fabric and extends longitudinally through width of net fabric to be produced. Each of minor comb-like plates 59 is provided with three or four teeth similar to those of the comb-like plate adapted to extend through side meshes of produced net fabric, which are arranged near side edges of net fabric. Each of the tensioning members 62 has one tooth similar to that of the comb-like plate, adapted to engage alternately with the last extreme meshes in the first and second vertical row of meshes from either side extremity of net fabric produced for tensioning net fabric so as to hold in its full width, (Figs. 9, 12 and 13).

Either end of the comb-like plate 58 is secured on one end of a lever 57, the other end of which is pivotally connected with the lower end of a connecting bar 56 at 56', so that the comb-like plate may be turned on the pivots 56', 56' (Figs. 9, 12 and 13). The levers 57, 57 are arranged to bear on the cross pins 110', 110' of the forked ends of supports 110, 110 which are secured to one side of the frame 32 in its normal position, as will be hereinafter described. The other ends of the connecting bars 56, 56 are fixed on a longitudinally disposed shaft 105 which is journalled on the machine frame (Figs. 1, 9 and 12). Fixed on the shaft 105 is a connecting lever 55, the other end of which is pivotally connected with upper end of an actuating bar 54 by means of a pin connection at 111, as shown in Fig. 12. The lower end of the actuating bar makes a sliding connection with a shaft 35 on which a cam 53 rotates, by means of a slot 106 provided to receive said axis, and is also provided with a roller 112 adapted to engage with the face of the cam 53. It will be seen that the comb-like plate 58 may be moved transversely on the operation of the cam 53 through means of the actuating bar 54, connecting lever 55, shaft 105 and connecting bars 57, 57, while the same is arranged to be turned on the pivots 56', 56'. The cam 53 is arranged to operate so as to move backward the comb-like plate when turned upward from its normal position through a certain length, and to move forward the same when turned back to its normal position.

In operation, the comb-like plate is moved forward in its normal lowered position with its levers 57, 57 bearing on the cross pins 110', 110' of the forked ends of the supports 110, 110 to engage its teeth with the last crossings of produced net fabric and twines diverging downward from the crossings, by means of the cam 53, before the formation of a new horizontal row of crossings begins, and on the completion of the formation of said crossings the comb-like plate is turned upward, its teeth engaging with the meshes just formed, as net fabric is pulled up by the take-up device to next crossing position, and then the same is moved backward to withdraw its teeth from the meshes, whereby the comb-like plate is released to lower to its normal position, and then the same is moved forwardly again by means of the cam 53.

Each of the minor comb-like plates 59 is fixed on the side arm of a transversely movable slide 60 mounted on a guide fixed on either end of front side of the frame 32 so that the teeth may be brought into position above and opposite the teeth of the comb-like plate 58. Each slide 60 is connected to a connecting bar 56 by means of a connecting link 61, so that the minor comb-like plates may be moved forward and backward as the connecting link is moved from the cam 53 as aforementioned. In operation, the minor comb-like plates are moved forward to engage their teeth with two or more meshes of either end of a longitudinal row of meshes of net fabric as just formed, before the comb-like plate 58 is moved backward to withdraw their teeth from the meshes of net fabric, and then are moved backward to withdraw their teeth from the meshes after the comb-like plate has been moved forward in its normal lowered position to engage its teeth with the last crossed parts, so that the minor comb-like plates function to hold the full width of the net fabric produced during the lowering and advancing operations of the comb-like plate 58, the teeth of the minor comb-like plates functioning to guide the outer side strands or twines of concerned meshes. As soon as the comb-like plate is operated to its advanced position, the minor comb-like plates will be operated to withdraw their teeth from the concerned meshes of net fabric produced.

Each tensioning member 62 is pivotally mounted on a lateral extension of the lever 57 of the comb-like plate 58 at 66 near the middle of said member and is normally held in position by a tension spring 128, ends of which are secured on a pin 57' on the lever 57 and another pin 62' on the said tensioning member respectively, while the outer end of said tensioning member is provided with a pin 63 adapted to engage with a bracket 67 fixed on an operating lever 46 arranged to be moved so as to turn the tensioning member on the pivot 66 against the spring (Figs. 9 and 13). It will be noted that the tensioning member will be moved up, or down, or forward, or backward together with the comb-like plate 58. The tensioning members function to maintain the meshes of net fabric which is being taken up to next crossing position by the take-up device in regular condition, by engaging their fore ends with extreme meshes at ends of a longitudinal row of meshes as just formed of net fabric to stretch the same outwardly.

With the arrangement comprising in combination the comb-like plate, minor comb-like plates and tensioning members, any influence due to the tendency of reducing the width of produced net fabric due to the pull of the take-up device is remedied, so that regular meshes of net fabric may be obtained, this serving also to hold the operation for making net fabric in order.

In the known net-making machines, each crossing race-way is arranged between two twisting race-ways in a bed-plate of a shape similar to one half part of a cylinder, and said twisting race-way is adapted to twist strands together while said crossing race-way is adapted to cross strands, and the formed net fabric is usually taken up by means of a take-up device as it is formed. In this case, the width of the intermediate part of the net fabric tends to be reduced, whereby the space between two crossings of each mesh taken in each longitudinal row is caused to be reduced, and the reduction of the space will be greater toward sides from central part. This will cause the twisting and crossing operations to get into troubles resulting from irregularity of the meshes of the net fabric. For purpose of doing away with this disadvantage, it has been proposed to draw up the net fabric by bringing each mesh into engagement with each hook member, a number of hook members being arranged in suitably spaced relation in a series. In this case, when the cross point of each mesh is not squarely engaged by the hook member, as may be the case occasionally, so that the strands will not be uniformly drawn, thereby the irregularity of the meshes of the net fabric and the twisting of the twines results. The invention provides the arrangement for the purpose of obviating such disadvantage, whereby a uniformity of the twisting of the twines and a proper tightness of the crossings may be obtained, as the twisting and crossing operations may be effected in regular condition of the strands without the strands being influenced by natural tendency of reducing the width of several preceding meshes of the net fabric as already formed, and consequently a net fabric of good quality having regular meshes may be obtained. Furthermore, the disadvantage of impairing the strands sometimes by striking against the tip of the hook members with the known net-making machines may be avoided by use of the arrangement according to the invention. In this view, the arrangement is worthy of rationalizing the net-making machines of this class, with a simple construction.

*Take-up devices*

The take-up device for the formed net fabric forms no part of the invention and may be any suitable construction, but in the drawings are illustrated as comprising a feeding roller 68, a follower 68', and a take-up roller 69 (Figs. 1, 2 and 3).

*Operating mechanism*

To impart power to the various mechanisms of the machine, the main driving shaft 70 (Figs. 1 and 2) is provided with a clutch device 71 which may be of any suitable construction and is operable by means of a handle 72. The power from the main driving shaft 70 is transmitted to a longitudinal shaft 73 journalled on the lower part of the machine frame 2, through means of gears 114 and 115. The shaft 73 carries a number of bevel gears 75', each of which meshes with another bevel gear 75 rigidly secured on the arbor 8 of the disk 6 in the middle race-way of each row of series of the twisting and crossing race-ways (Figs. 1, 3, 4, 5 and 6). The arbor of the disk in the middle race-way carries another gear 74 which meshes with gears rigidly secured on the arbors of the disks in two contiguous race-ways, which in turn meshes with other gears rigidly secured on the arbors of the disks in other contiguous race-ways in each row of series of the race-ways, and so on successively, so as to form a train of transversely arranged gears meshing with one another. The gear rigidly secured on the arbor of the disk in each crossing race-way at the junction of two adjacent rows of the series of the race-ways is arranged to mesh with an additional gear (not shown) rigidly secured on the arbor of the disk in one or other of contiguous twisting race-ways. With this arrangement, it will be appreciated that all the disks will continuously be rotated from the main driving shaft in contrary directions in pairs.

The pattern mechanism is arranged to be driven from the main driving shaft 70 through means of the gear 117 rigidly secured on the shaft 116 journaled on the machine frame and meshing with the gear 114 on said main driving shaft, the bevel gear 76 rigidly secured on the same shaft as said gear, another bevel gear 76' rigidly secured on one end of the shaft 77 to mesh with said bevel gear 76, the worm 78 rigidly secured on other end of said shaft 77 and the worm wheel 78' rigidly secured on one end of the shaft 79 of the drum 25 of the pattern mechanism (Fig. 1).

To operate the arrangement for disposing of strands, the main driving shaft 70 is provided with the friction clutch 80 with the gear 81 associated therewith (Figs. 1 and 2), which gear is arranged to transmit power to the cams 65, 65 on the shaft 64 through means of a gear 84 secured on the shaft 85 and a gear 118 secured on the same shaft and gears 119, 120 and 121 (Fig. 2). The connecting link 82 (Figs. 1 and 2) is at one end pivotally connected with the slide member of the clutch 80, while other end is connected with the outer end of one arm of the three armed lever 83 (Figs. 2 and 6) rigidly secured on the shaft 22 journalled on the machine frame. The lower end 83' of another arm of the three armed lever 83 normally engages with a depression 86' of the cam 86 (Figs. 1, 2 and 6) rigidly secured on the shaft 85 journalled on the machine frame and carrying the gear 84 fixed thereto which meshes with the gear 81 on the main driving shaft 70, while the outer end of the remaining arm of said three armed lever is connected with the lower end of the rod 87, the upper end of which is connected with the actuating lever 88 pivotally mounted, at the inner side of a number of the jacks 23, on the shaft 24 journalled on the machine frame and on which said jacks 23 are pivotally mounted. The three armed lever is arranged to be held in normal position by means of a straining spring 89 (Fig. 6), one end of which is secured on one arm while other end is secured on suitable fixed part of the machine. The fore end of the actuating lever 88 is arranged to be actuated by pattern rollers 113' (Fig. 2) on the chain 113 of the pattern mechanism (Figs. 1 and 2) so that upon engagement of the fore end of said lever with said pattern rollers the three armed lever 83 is moved against said spring through means of the rod 87, so as to bring the end 83 of the arm into disengagement with the depression 86' of the cam 86 and to move downward the connecting link 82 whereby the movable member of the clutch 80 is rotated to mesh with the stationary member of said clutch to securely connect the gear 81 with the main driving shaft 70 to transmit power from said main driving shaft 70 to the shaft 85. As soon as the gear 81 has been securely connected with the main driving shaft 70, the shaft 85 will be driven from said main driving shaft until the end 83' of the arm has engaged with the depression 86' of the cam 86 again, that is, the shaft 85 has made one revolution, as the gear 81 will remain securely connected with said main driving shaft during the engagement of the end 83' of the arm with the other portion of the cam 86 than the depression 86', or the round portion thereof. It will be appreciated that the shaft 85 will be intermittently rotated as the fore end of the actuating lever 88 will intermittently engage with the pattern rollers on the chain, and consequently the cams 47 on the shaft 64 will be intermittently operated, the operation of the cams causing the connecting levers 45, 45 and 45', 45' for operating the guide-plates to be operated through means of the operating levers 46, 46, as said cams will be operated from the shaft 85 as hereinbefore mentioned (Fig. 9).

The shaft 85 carries the cam 53 rigidly secured thereon, which will be intermittently operated to operate the comb-like plates 58, 58 through means of the actuating bar 54, connecting lever 55, shaft 105, connecting bars 56, 56 and levers 57, 57 (Figs. 12 and 13). The connecting bars 56, 56 will also operate the minor comb-like plates 59, 59 through means of the connecting links 61, 61. The tensioning members 62, 62 are intermittently operated from the cams 47, 47 fixed on the shaft 64 through means of the operating levers 46, 46.

To impart power to the take-up device, the shaft 73 is provided with a ratchet-wheel 90 rigidly secured thereon, from which the power is transmitted to the gear 95 by means of a pawl 91 pivotally connected with the end face of the gear 95 and engaging with the end of one arm of a bell crank 92 pivotally and loosely mounted on the shaft 85 (Figs. 1, 2 and 6). Other arm of the lever 92 is connected with the rear end of the actuating lever 94 pivotally mounted on the shaft 24 at the outer side of a number of the actuating lever 23 by means of the connecting link 93. The actuating lever 94 is arranged to engage with the pattern rollers of the chain at its fore end, so that upon the movement of said rollers the pawl and ratchet-wheel are operated to cause the gear 95 to be driven, in turn the gear 96 secured on a shaft 124 (Fig. 1) and meshing with said gear. The movement of the gear 96 is transmitted to the feed roller 68 by means of a ratchet-wheel 122 (Fig. 1) fixed on the shaft 127 of the feed-roller, a lever 98 with a pawl 123 for driving said ratchet-wheel at one end and a connecting link 97, one end of which is pivotally connected with the other end of the lever while the other end is pivotally connected with a pin 126 fixed eccentrically on a wheel 125 secured on the shaft 124, so that the feed-roller 68 may be intermittently rotated to cooperate with the follower 68' to cause the take-up roller 69 to take up net fabric produced.

Having now particularly described and ascertained the nature of my said invention and in what manner the same is to be preformed, I claim:—

1. A machine for making net fabric for fishing and other purposes, as in claim 4 characterized by springs to hold the slide-bars in position, the switches in each longitudinal row being operatively connected to the slide bars and actuated against the springs by pattern mechanism through the medium of suitable gearings, and held in the position to open the twisting race-ways and close the crossing race-ways by means of other springs in cooperation with the first named springs.

2. A machine for making net fabric for fishing and other purposes as in claim 4, in which the springs for re-twisting each strand are arranged to lie partly in each twisting race-way so as to engage with the knurled end of each bobbin-spindle, whereby each bobbin-spindle is rotated to retwist each strand while the bobbin-spindle is propelled in each twisting race-way.

3. A machine for making net fabric for fishing and other purposes, as in claim 4, characterized by the carrier disks for twisting and crossing strands which are to be rotated continuously in contrary directions in pairs from the main driving shaft through means of gearings in driving relation with a gear on the arbor of a carrier disk in each row, each carrier disk in each row being provided with a gear fixed on its arbor and arranged to mesh with contiguous gear or gears, and the arrangement for disposing of strands and the arrangement for regulating meshes of net fabric are arranged to be operated from the main driving shaft through means of a three armed lever, one arm of which is connected with an actuating lever operable from the pattern mechanism, while another arm is arranged to engage with a cam and the other remaining arm is pivotally connected with a slide member of a clutch adapted to connect or disconnect a gear on the main driving shaft with the same.

4. A series of bobbin-spindles, rotating carrier discs on which the bobbin spindles are mounted, switches beneath the carrier discs for moving the bobbin spindles in a sinuous manner from one carrier disc to the next one in series; an arcuate bed-plate, the carrier discs arranged in rows on the arcuate bed-plate; a minor bed-plate situated above the arcuate bed-plate, a series of movable guide plates situated above the minor bed-plate for disposing the strands, a series of movable comb-like plates situated above the movable guide-plates for regulating the meshes of the fabric, a take-up device consisting of rollers; a series of slide bars for activating the switches beneath the carrier discs, a pattern mechanism for determining the movement of the bob-rods, thus determining the movement of the bobbin-spindles, a series of spring so placed as to cause the bobbin spindles to rotate on its own axis to retwist the strand before twisting strands together and an operating mechanism for driving the several mechanisms of the machine.

5. A machine as claimed in claim 4 characterized in that said bed-plate, switches and carrier discs are arranged to constitute a series of race-ways arranged sinuously in several rows.

6. A machine as claimed in claim 4 characterized in that said bed-plate, switches and carrier discs are arranged to constitute a series of race-ways arranged sinuously in several rows, the carrier discs at the ends of the extreme race-ways forming exchange race-ways.

7. A machine as claimed in claim 4, characterized in that said minor bed-plate is provided with a continuous stepped guide way for strands above said minor bed-plate, said guide plates being arranged in upper and lower groups, the lower group of guide plates having stepped notches arranged to extend oppositely on and across said minor bed-plate from the front and rear sides thereof, the upper guide plates having stepped notches and arranged similarly to the lower guide plates, and horns pivotally mounted on the minor bed-plate.

8. A machine as claimed in claim 4 characterized in that said minor bed plate is provided with a continuous stepped guide way, said guide way being arranged in sections corresponding to the number of rows of the carrier discs in zig zag relation, each section being stepped by the number of pairs of strands which are to be crossed in each row of the carrier discs, said guide plates being arranged in upper and lower groups, said group being provided in pairs for each section of the guide way and are provided with stepped notches corresponding to one-half the number of the steps in each section of the guide way, and arranged to be moved in opposite directions in pairs, said upper and lower groups of guide plates adapted to be moved in opposite directions and horns pivotally mounted on the minor bed-plate adapted to replace the extreme notches of the upper guide plates.

9. A machine as claimed in claim 4, characterized in that said minor bed-plate is provided with a continuous stepped guide way for strands above said minor bed-plate, said guide plates being arranged in upper and lower groups, the lower group of guide plates having stepped notches arranged to extend oppositely on and across said minor bed-plate from the front and rear sides thereof, the upper guide plates having stepped notches and arranged similarly to the lower guide plates, and horns pivotally mounted on the minor bed-plate, these stepped notches forming holes receiving the strands to be crossed and the strands moving from notch to notch during the fabrication of the net.

YEIICHI OKUMA.